United States Patent
Kostin

(10) Patent No.: US 8,328,155 B2
(45) Date of Patent: Dec. 11, 2012

(54) RAIL ADJUSTMENT SYSTEM FOR A MOTOR VEHICLE SEAT

(75) Inventor: Sergej Kostin, Coburg (DE)

(73) Assignee: Brose Fahrzeugteile GmbH & Co. Kommanditgesellschaft, Hallstadt (DE)

( * ) Notice: Subject to any disclaimer, the term of this patent is extended or adjusted under 35 U.S.C. 154(b) by 496 days.

(21) Appl. No.: 12/128,206

(22) Filed: May 28, 2008

(65) Prior Publication Data

US 2008/0309137 A1 Dec. 18, 2008

(30) Foreign Application Priority Data

Jun. 14, 2007 (DE) .......................... 10 2007 027 322

(51) Int. Cl.
*F16M 13/00* (2006.01)

(52) U.S. Cl. ..................... 248/429; 248/430; 296/65.15; 297/344.1

(58) Field of Classification Search .................. 248/424, 248/429, 430; 296/65.15; 297/344.1; 74/89.14
See application file for complete search history.

(56) References Cited

U.S. PATENT DOCUMENTS

| | | | | |
|---|---|---|---|---|
| 4,781,414 | A * | 11/1988 | Periou | 297/313 |
| 5,240,310 | A * | 8/1993 | Rink | 297/452.18 |
| 5,273,242 | A * | 12/1993 | Mouri et al. | 248/429 |
| 5,314,158 | A * | 5/1994 | Mouri | 248/429 |
| 5,709,363 | A * | 1/1998 | Matsuhashi | 248/421 |
| 5,791,622 | A | 8/1998 | Gauger | |
| 5,797,576 | A * | 8/1998 | Gauger | 248/429 |
| 5,816,555 | A * | 10/1998 | Ito et al. | 248/429 |
| 6,189,852 | B1 * | 2/2001 | Hopley et al. | 248/430 |
| 6,643,900 | B2 * | 11/2003 | Jahrling | 24/563 |
| 7,070,155 | B2 * | 7/2006 | Garrido et al. | 248/424 |
| 7,437,962 | B2 * | 10/2008 | Taubmann et al. | 74/89.1 |
| 7,658,429 | B2 * | 2/2010 | Koga et al. | 296/65.15 |
| 7,703,347 | B2 * | 4/2010 | Porinsky et al. | 74/441 |
| 2005/0082890 | A1 * | 4/2005 | Taubmann et al. | 297/344.1 |
| 2008/0238126 | A1 * | 10/2008 | Koga et al. | 296/65.13 |
| 2009/0000424 | A1 * | 1/2009 | Taubmann et al. | 74/830 |
| 2009/0272869 | A1 * | 11/2009 | Beneker et al. | 248/429 |
| 2010/0051776 | A1 * | 3/2010 | Koga et al. | 248/429 |

FOREIGN PATENT DOCUMENTS

| | | |
|---|---|---|
| DE | 7144438 | 2/1972 |
| DE | 4401721 | 7/1995 |
| DE | 19815283 | 10/1999 |
| DE | 200 14 561 | 11/2000 |
| DE | 10200985 | 8/2003 |
| FR | 2883810 A1 * | 10/2006 |
| GB | 339 386 | 12/1930 |
| GB | 1180289 | 2/1970 |
| WO | 2009/074760 A1 | 6/2009 |

OTHER PUBLICATIONS

Office Action issued on Jul. 15, 2011, in corresponding EP application No. EP 08 00 1471.

* cited by examiner

*Primary Examiner* — Terrell McKinnon
*Assistant Examiner* — Daniel J Breslin
(74) *Attorney, Agent, or Firm* — Scott T. Weingaertner; Joseph D. Eng, Jr.; King & Spalding

(57) ABSTRACT

The invention relates to a rail adjustment system for a motor vehicle seat, wherein the rail adjustment system includes an electromotive spindle drive and a threaded spindle that can be coupled to a flexible drive shaft for the longitudinal adjustment of a rail pair. The rails of said rail pair are connected to one another by means of a retaining element, which includes an integrated guide duct for holding the drive shaft.

11 Claims, 5 Drawing Sheets

RAIL ADJUSTMENT SYSTEM FOR A MOTOR VEHICLE SEAT

FIELD OF THE INVENTION

The invention relates to a rail adjustment system for a motor vehicle seat, comprising a spindle drive and comprising a flexible drive shaft which can be coupled to a threaded spindle for the longitudinal adjustment of a rail pair whose rails are connected to one another by means of a retaining element.

BACKGROUND OF THE INVENTION

A rail adjustment system of this type, as is known from DE 198 15 283 C2 for example, comprises a drive motor which is fixed, centrally between two rails of a seat rail pair, to a mounting plate which is connected to the upper rails of said rails. Both sides of the drive motor are connected to a spindle nut which is mounted in a spindle gear mechanism by means of drive shafts which can also be designed as flexible shafts. Said spindle nut interacts with a threaded spindle which is arranged between an upper rail, which can be displaced in the longitudinal direction, and a lower rail which is stationary or fixed to the floor. A rotary movement of the drive motor is therefore converted into a longitudinal displacement of the respective upper rail in relation to the corresponding lower rail of the rail pair by means of the drive shafts and the spindle gear mechanism.

The flexible drive shaft, which has a rotating flexible core and a casing tube which is also flexible and surrounds said core, can be passed through an additional tube for the purpose of stabilizing its position. As an alternative, the flexible shaft can also be stabilized by support points for the rotating core being integrated in the flexible casing tube between the ends of said casing tube as per DE 102 00 985 B4.

While the provision of an additional support tube for the flexible drive shaft entails increased outlay on parts, a flexible drive shaft, whose flexible casing tube is provided with support points for the rotating core, is complicated in terms of production. In addition, rail adjustment systems whose spindle drives are equipped with drive shafts of this type have a tendency to create undesirable noise.

SUMMARY OF THE INVENTION

The invention is based on the object of specifying an improved rail adjustment system of the type mentioned in the introduction. A particular aim is to provide a suitable guide for a flexible drive shaft while at the same time creating as little noise as possible.

According to the invention, this object is achieved by a guide and/or holding duct for the drive shaft that is integrated in the retaining element which runs between the rails of the rail pair.

In an advantageous refinement, the guide duct has a number of support elements and support gaps. In this case, the guide duct is expediently bounded by a first support row and a second support row, with the two support rows being situated opposite and at a distance from one another. In this case, the distance corresponds at least to the outside diameter of the flexible drive shaft. If the two support rows are situated opposite one another in the z-direction—based on the customary vehicle coordinate system—the guide duct is preferably bounded by two side walls which are again situated opposite one another at a distance at least of the outside diameter of the drive shaft in the x-direction (rail or vehicle longitudinal direction).

The two support rows, which each have support elements and support gaps which are arranged one behind the other and such that they alternate, are offset in relation to one another in such a way that a support element in each case preferably at least partially, but expediently completely, spans an opposite support gap.

The support elements are suitably in the form of web-like structure sections of the retaining element. In an expedient refinement, a local support point is integrally formed on each support element. The respective position of the individual support points on the corresponding support element is preferably selected in such a way that in each case two support points are arranged opposite and inclined in relation to one another within the two support rows.

The retaining element is therefore expediently produced from plastic and preferably in the form of an injection-molded part. In this case, the retaining element suitably has a lattice structure which flanks both sides of the guide duct. A stable, bending- and twisting-resistant retaining element can be produced in a material-saving manner in this way. Retaining lugs at both ends of the retaining element permit them to be fixed to rails which are situated opposite and at a distance from one another, in particular to their upper rails.

The retaining element expediently has a recess in which the electric motor or drive motor of the spindle drive, which is also called the drive system in the text which follows, is situated and can be fixed. In this case, the recess is made in the retaining element so as to form a comparatively long carrier section and a comparatively short carrier section, with the guide duct extending within the comparatively long carrier section.

The advantages achieved by the invention are, in particular, that reliable guidance and mounting of the drive shaft are ensured in a simple manner by the arrangement of a rotation-resistant, but otherwise flexible, drive shaft in a guide duct of a retaining element or carrier part which is arranged between the rails of a rail pair of a motor vehicle seat. In addition, noise creation which is associated with such a drive system, in particular a spindle drive, is avoided or at least considerably reduced. This is of considerable importance in terms of comfort, especially since the drive system is usually positioned relatively close to the user beneath the corresponding vehicle seat, and there under the seat surface.

On account of the preferably decentral arrangement of the electric motor of the spindle drive, the comparatively long operating path from the spindle drive to the remote rail is bridged by the flexible drive shaft and, in the process, the drive force of the spindle drive is reliably transmitted to the corresponding threaded spindle. The drive force on the rail close to the electric motor is then transmitted to the threaded spindle via a comparatively short drive path. A short shaft journal is suitably sufficient for this purpose.

Particularly reliable integrated motor and shaft mounting and shaft guidance are provided by the guide duct being formed within the retaining element in the form of support rows, which are offset in relation to one another, of expediently web-like support elements and support gaps which are arranged one behind the other and such that they alternate and are suitably integrally formed in a retaining element which is in the form of a plastic structural part. This permits threading of the flexible drive shaft into and out of the guide duct, which is in the form of a support structure, in a simple manner for mounting purposes, particularly in the case of initial mounting and also for repair purposes.

The support and guide structure within the retaining element for the flexible drive shaft can be implemented in a virtually pointwise manner, that is to say the flexible drive shaft is supported along the guide duct on opposite sides in the region of the support elements at a plurality of local points. The support points which are suitably integrally formed on the support elements for this purpose and are in the form of dome-like raised areas are preferably positioned in such a way that these raised support structures are in each case situated opposite one another in pairs and in the process are arranged as physically close to one another as possible.

The resulting grid-like support structure, which is accordingly formed at points, of the correspondingly formed support or guide duct for the flexible drive shaft can therefore be mounted in this specially configured guide duct in a particularly simple manner. The creation of vibrational noise is reliably suppressed on account of the suitable stabilization of the position of the drive shaft.

DETAILED DESCRIPTION

Corresponding parts are provided with the same reference symbols in all the figures.

Figure 1:
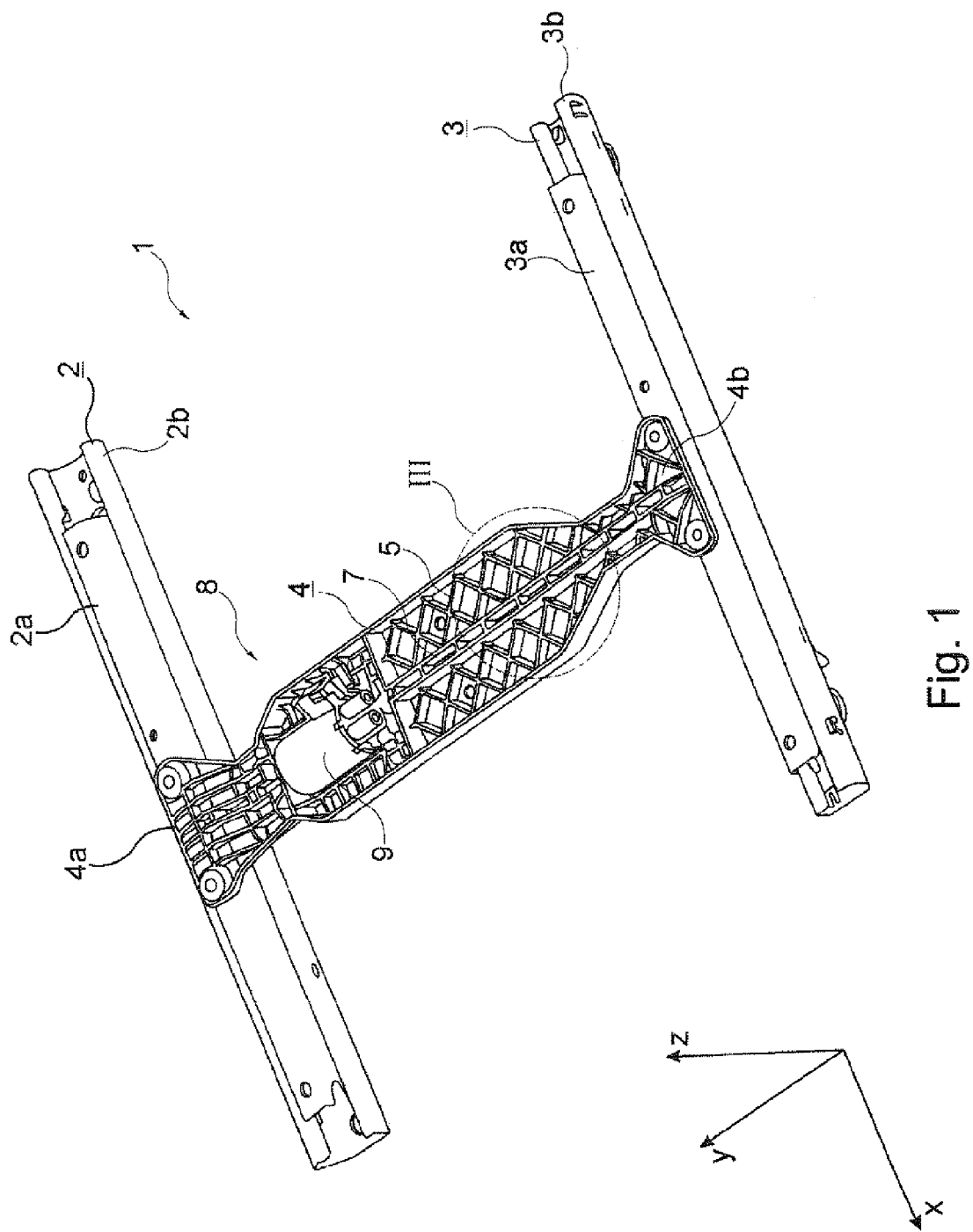
FIG. 1 shows a perspective illustration of a rail pair with a retaining element fixed to it, said retaining element having an inserted drive motor and an integrally formed guide duct for a flexible drive shaft.
Figure 2:
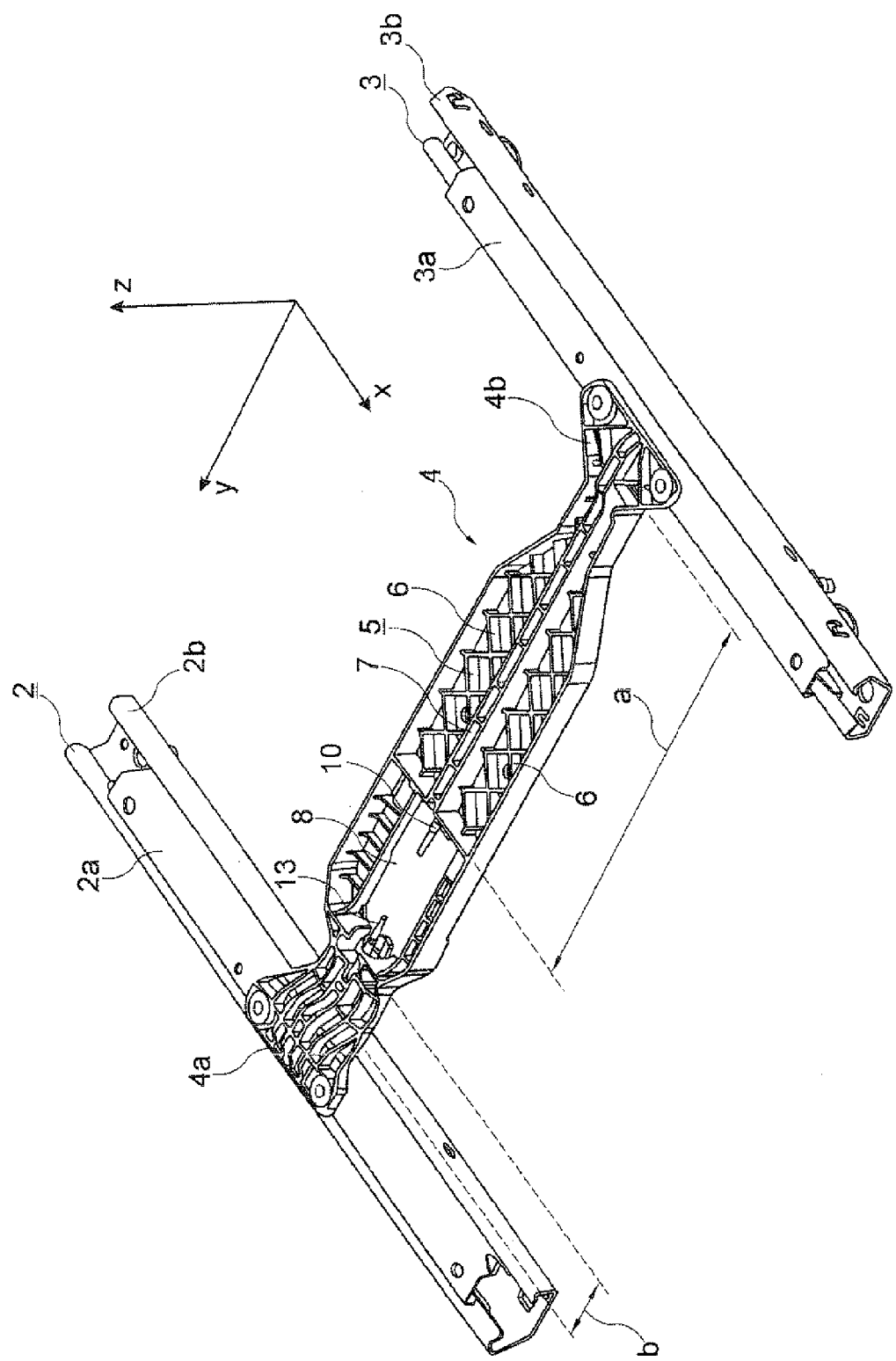
FIG. 2 shows the rail adjustment system according to FIG. 1 without a drive motor.

FIGS. 1 and 2 show a rail adjustment system 1 for a motor vehicle seat, comprising a rail pair whose rails 2, 3, which are situated opposite and at a distance from one another and run parallel to one another, each comprise an upper rail 2a, 3a and a lower rail 2b or 3b. A carrier part, which is called retaining element 4 in the text which follows, is connected to the upper rails 2a, 3a.

Based on a vehicle coordinate system, the upper rails 2a, 3a can be longitudinally displaced in the x-direction in relation to the lower rails 2b or 3b which are fixed to the floor of the vehicle. The retaining element 4 therefore extends in the y-direction, that is to say transverse to the rails 2, 3. A vehicle seat (not illustrated) and a corresponding seat frame are fixed to the upper rails 2a, 3a.

The retaining element 4 is a plastic injection-molded part. It has retaining lugs 4a, 4b at both ends, by means of which the retaining element 4 is connected, for example screwed or riveted, to the rails 2, 3, and there to the upper rails 2a or 3a. The retaining element 4 has, particularly in a comparatively long carrier section a, a lattice-like support structure 5, which is called support structure in the text which follows, with a large number of lattice webs 6 which are arranged to form squares or diamonds.

A guide duct 7 is provided within this lattice structure 5 of the carrier section a. In this case, the lattice structure 5 flanks the guide duct 7 on both sides and preferably symmetrically. Starting from a decentral recess 8—which can be seen comparatively clearly from FIG. 2—the guide duct 7 extends along the carrier section a as far as the remote rail 3 which is at the front in the illustrations according to FIGS. 1 and 2. A comparatively short carrier section b extends on the opposite side, again starting from the recess 8, as far as the rail 2 which is closest to said recess and is at the top. The recess serves to hold and fix an electric motor 9 of a drive system which is designed as a spindle drive.

Figure 5:
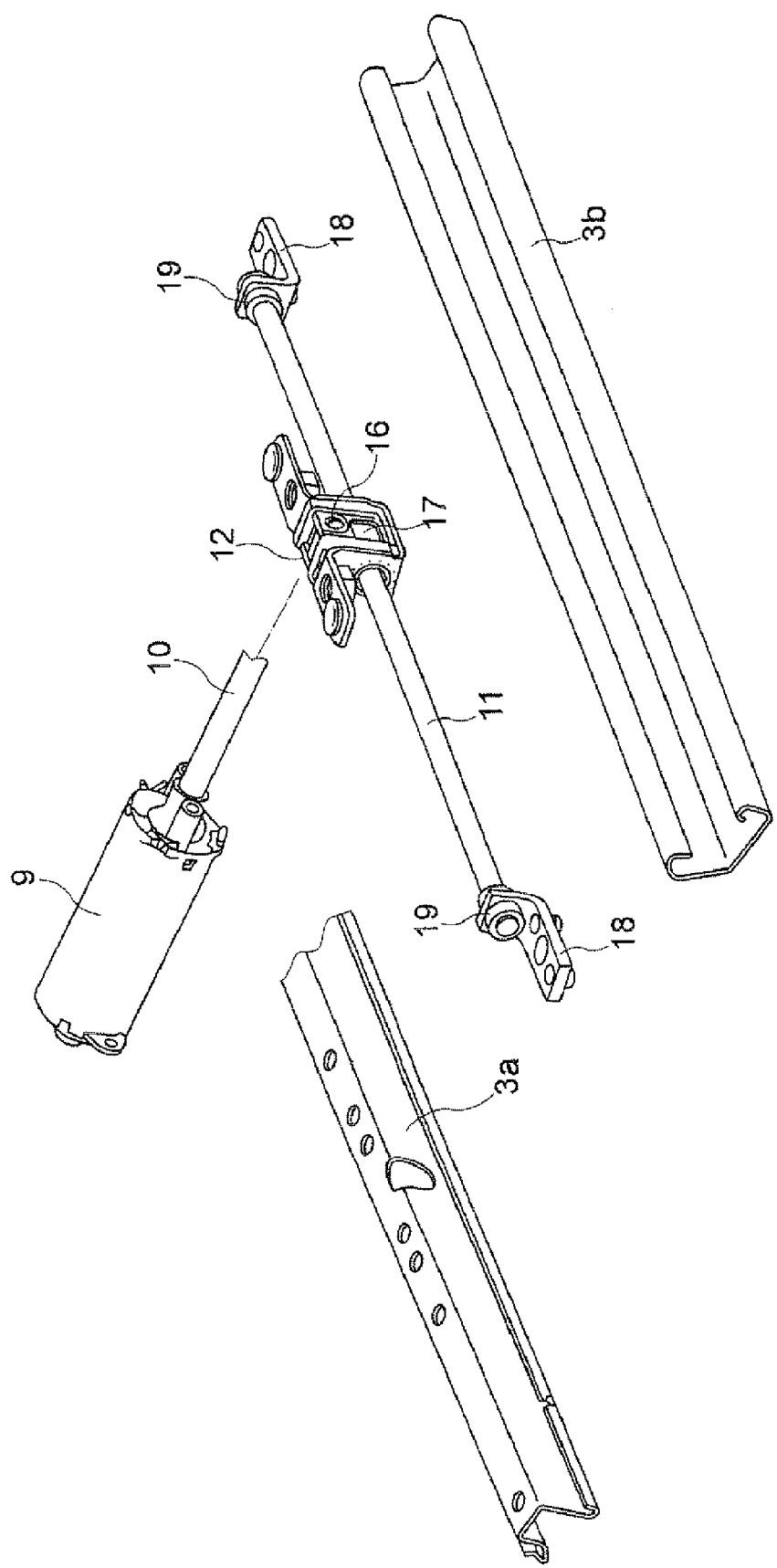
FIG. 5 shows an exploded illustration of the spindle drive of one of the rails with a threaded spindle and a spindle gear mechanism which can be coupled to the electric motor by means of the flexible drive shaft.

The drive force of the electric motor 9 is firstly transmitted by means of a flexible drive shaft 10 to the rail 3 which is remote from the electric motor 9, and there to a threaded spindle 11 (FIG. 5). According to FIG. 5, the rotary movement of the drive motor 9 is therefore transmitted by means of the flexible drive shaft 10 to a spindle gear mechanism 12, and from there to the threaded spindle 11, as a result of which the upper rail 3a is longitudinally adjusted in relation to the lower rail 3b. In this case, the flexible drive shaft 10 is arranged within the guide duct 7 in the retaining element 4.

Secondly, the drive force of the electric motor 9 is transmitted by means of a shaft journal 13 (FIG. 2), which runs along the comparatively short carrier section b, to the rail 2, and there again to a threaded spindle.

Figure 3:
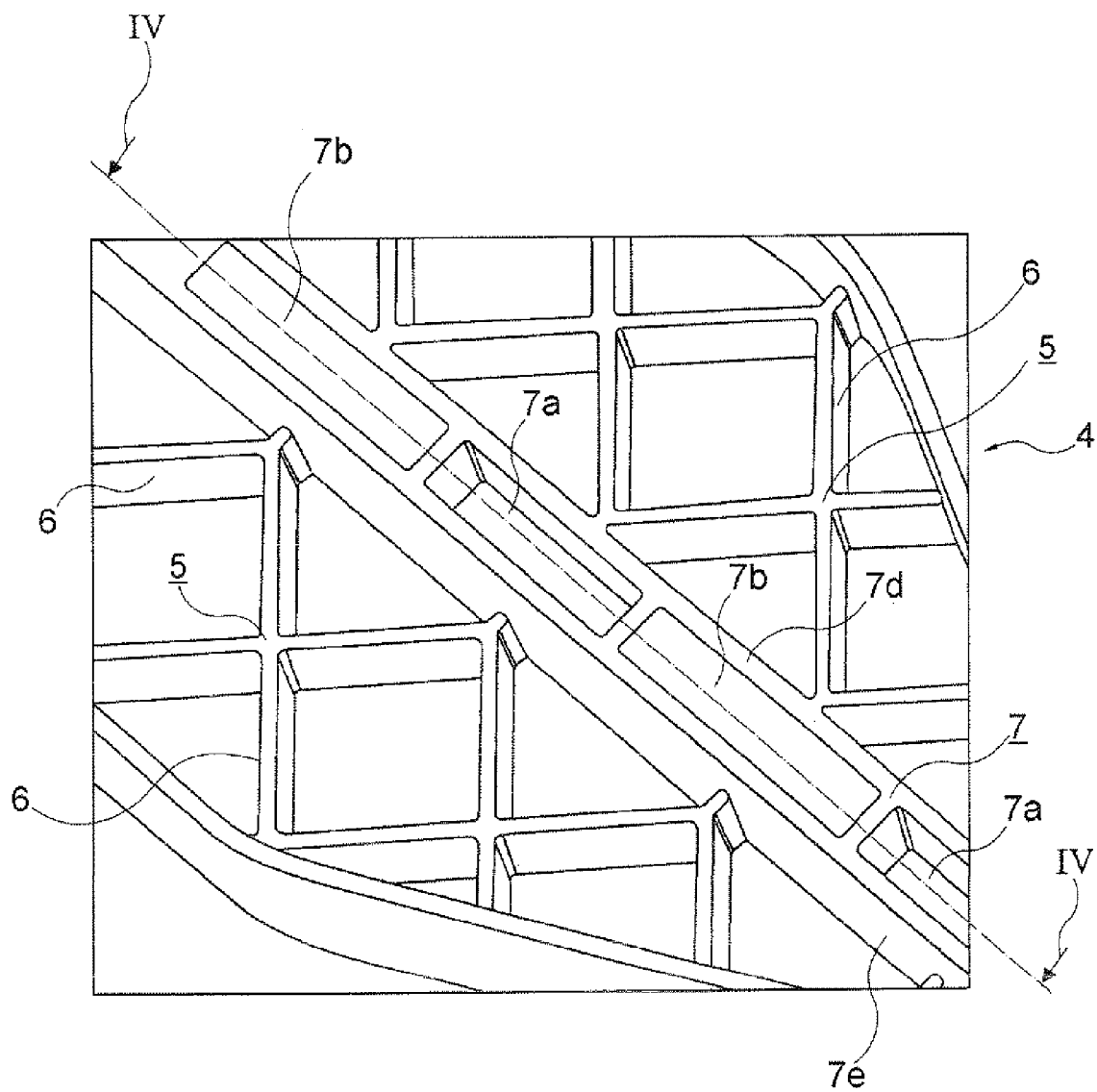
FIG. 3 shows a detail III from FIG. 1 on an enlarged scale with a structured guide duct.
Figure 4:
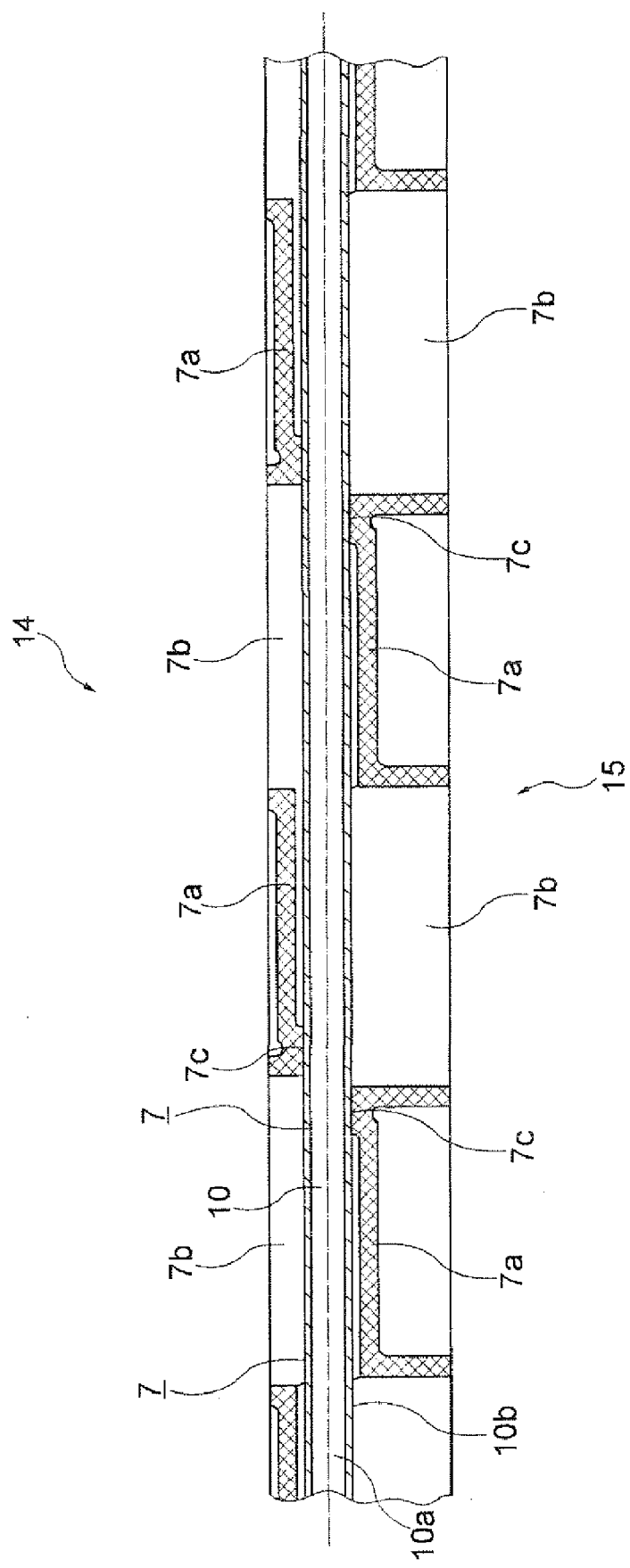
FIG. 4 shows a longitudinal section through the structured guide duct along line IV-IV in FIG. 3.

FIGS. 3 and 4 show the guide duct 7 for the flexible drive shaft 10 on an enlarged scale. This guide duct 7 is therefore formed firstly by web-like support structures or elements 7a, which are drawn-in in the manner of a cover, and secondly by support gaps 7b which are cut out in the manner of a window. Upper and lower support rows 14 and 15 which are situated opposite one another in the z-direction and have support elements 7a and support gaps 7b, which are arranged one behind the other in the y-direction and such that they alternate, are formed in the process. The first support row 14 and the second support row 15 are arranged offset in relation to one another. As a result, a support gap 7b of one support row 14, 15 is situated opposite a support element 7a of the other support row 15 or 14. The web-like support elements 7a at least approximately completely span the respectively opposite support gap 7b. Dome-like raised areas which form local support points 7c are integrally formed on the web-like support elements 13a.

As can be seen comparatively clearly from FIG. 3, the guide duct 7 is bounded at the sides by side walls 7d and 7e which are situated opposite and at a distant from one another in the x-direction and likewise extend along the comparatively long partial section a of the retaining element 4. Overall, the clear width of the guide duct 7 is matched to the thickness of the flexible drive shaft 10 in this case; that is to say the clear width of the guide duct is slightly larger than or equal to the outside diameter of the drive shaft 10.

As can be seen comparatively clearly from FIG. 4, the flexible drive shaft 10 is supported at these support points 7c in a pointwise or linewise manner. In this case, opposite support points 7c of the respective support elements 7a are slightly offset in relation to one another in the y-direction. The flexible drive shaft 10, whose flexible rotation-resistant core 10a is surrounded by a similarly flexible casing tube 10b, is therefore supported along the guide 7 at a plurality of supporting points which are formed substantially by the raised support points 7c, but fundamentally by the respective support elements 7a.

As illustrated in FIG. 5, the drive shaft 10, which is guided in the guide duct 7, is connected, in the spindle gear mechanism 12, to a worm gear 16 which meshes with a spindle nut 17 of the spindle gear mechanism 12. A rotary movement of the drive shaft 10 which is driven by the electric motor 9 is converted into a corresponding rotary movement of the spindle nut 17 which, for its part, meshes with the threaded spindle 11.

In the exemplary embodiment, the spindle gear mechanism 12 is firmly connected to the respective upper rail 3a, while the threaded spindle 11 is firmly connected to the lower rail 3b of the corresponding rail 3. To this end, retaining lugs 18 are provided at both ends of the threaded spindle 11. These retaining lugs are provided with rotary bearings 19 in which the threaded spindle 11 rests such that it can rotate.

A corresponding longitudinal displacement of the spindle gear mechanism 12 along the threaded spindle 11 therefore also adjusts the associated upper rail 3a—and likewise, by means of the shaft journal 13, the upper rail 2a of the opposite rail 2—in the x-direction. This causes a corresponding adjusting movement both of the motor vehicle seat frame, which is connected to the upper rails 2a, 3a, and also of the retaining element 4 in the longitudinal direction (x-direction) of the rails.

What is claimed is:

1. A rail adjustment system for a motor vehicle seat, the rail system comprising
    an electromotive spindle drive; and
    a flexible drive shaft configured to be coupled to a threaded spindle for the longitudinal adjustment of a rail pair whose rails are connected to one another by means of a retaining element,
    wherein the retaining element has a guide duct for holding the drive shaft,
    wherein the guide duct is formed by a plurality of support elements and support gaps, and
    wherein the guide duct is bounded by a first support row on one side of the guide duct, the first support row comprising support elements and support gaps that are arranged one behind the other and such that they alternate in the longitudinal direction of the shaft, and by a second support row, which is situated opposite and at a distance from the first support row, the second support row comprising support elements and support gaps that are different from the support elements and support gaps of the first support row.

2. The rail adjustment system according to claim 1, wherein each support element at least partially spans an opposite support gap.

3. The rail adjustment system according to claim 1, wherein a local support point is integrally formed on each support element.

4. The rail adjustment system according to claim 3, wherein in each case two support points are arranged opposite and inclined in relation to one another.

5. The rail adjustment system according to claim 1, wherein the guide duct runs between two side walls of the retaining element that are situated opposite and at a distance from one another.

6. The rail adjustment system according to claim 1, wherein the retaining element comprises a recess, which is arranged off-center, for mounting the spindle drive, so as to form a comparatively long carrier section and a comparatively short carrier section, the guide duct extending along the comparatively long carrier section.

7. The rail adjustment system according to claim 1, wherein the retaining element comprises a frame-like lattice structure that flanks both sides of the guide duct.

8. The rail adjustment system according to claim 1, wherein the retaining element is fixed to the rails, which are situated opposite and at a distance from one another, in particular to at least one of a plurality of upper rails, by means of retaining lugs on either end.

9. The rail adjustment system according to claim 1, wherein the retaining element comprises plastic.

10. A motor vehicle comprising the rail adjustment system according to claim 1.

11. A rail adjustment system according to claim 1, wherein the second support row comprises support elements and support gaps that are arranged offset in relation to the first support row.

* * * * *

UNITED STATES PATENT AND TRADEMARK OFFICE
CERTIFICATE OF CORRECTION

PATENT NO. : 8,328,155 B2
APPLICATION NO. : 12/128206
DATED : December 11, 2012
INVENTOR(S) : Sergej Kostin It is certified that error appears in the above-identified patent and that said Letters Patent is hereby corrected as shown below:

Title page, Item (73) Assignee: The Assignee "Brose Fahrzeugteile Gmbh & Co. Kommanditgesellschaft, Hallstadt (DE)" should read -- Brose Fahrzeugteile Gmbh & Co. Kommanditgesellschaft, Coburg, Germany --.

Signed and Sealed this
Twelfth Day of February, 2013

Teresa Stanek Rea
*Acting Director of the United States Patent and Trademark Office*